Aug. 6, 1946.  A. J. WEATHERHEAD, JR  2,405,476
STEM ATTACHING MEANS FOR GLOBE VALVES
Filed Oct. 20, 1944
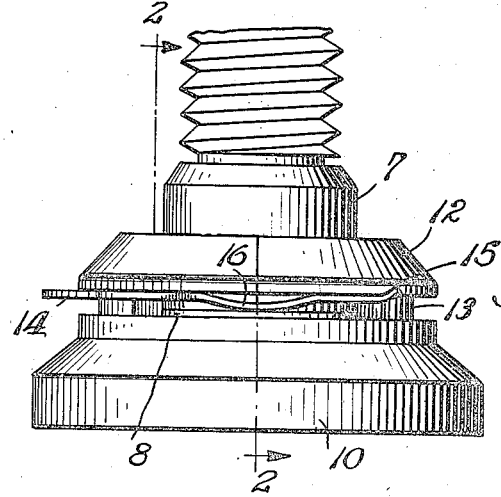
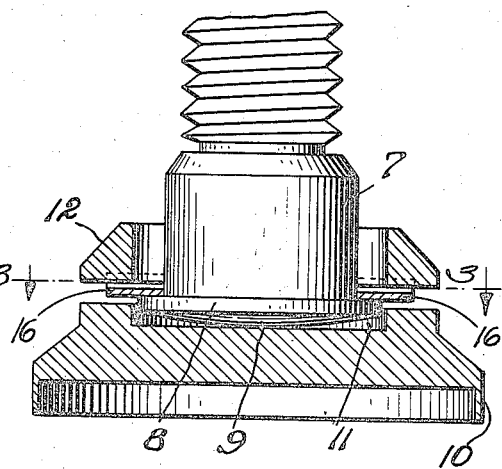
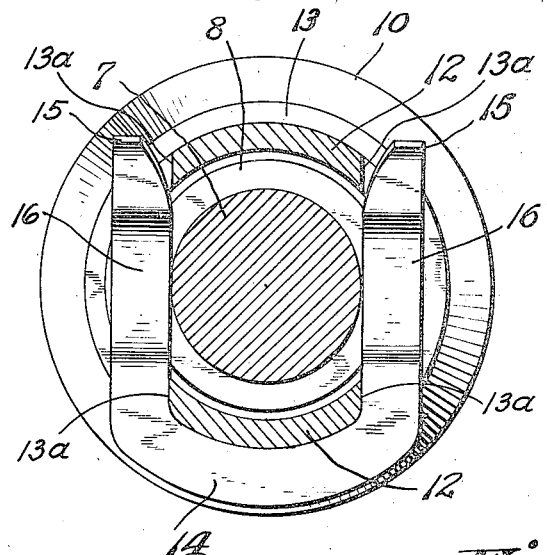
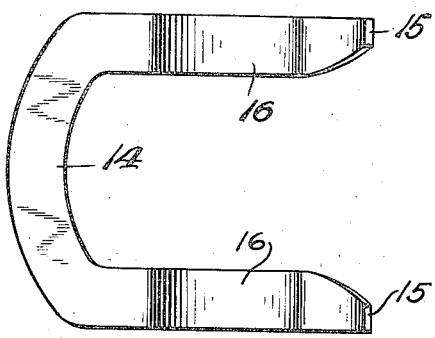
Inventor
ALBERT J. WEATHERHEAD, JR.
By Richey & Watts
Attorneys Patented Aug. 6, 1946

2,405,476

UNITED STATES PATENT OFFICE 2,405,476

STEM ATTACHING MEANS FOR GLOBE VALVES

Albert J. Weatherhead, Jr., Shaker Heights, Ohio, assignor to The Weatherhead Company, Cleveland, Ohio, a corporation of Ohio Application October 20, 1944, Serial No. 559,627

10 Claims. (Cl. 287—91)

This invention relates to valves, and particularly to means for connecting valve discs to the rotating stems of globe valves and the like.

The principal objects of this invention are to facilitate the attachment and replacement of valve discs; to provide universal angular movement of the valve disc with respect to the axis of the stem so that the disc may accurately align itself with its seat; and to frictionally connect a valve disc to a rotating stem so that the disc turns with the stem and wipes the seat under light engaging pressure, and the stem turns with respect to the disc under heavy engaging pressure, avoiding excessive wear of the parts.

The above and other objects of my invention will be evident from the following description of the preferred form as illustrated in the accompanying drawing, in which:

Fig. 1 is a side elevation of my improved attaching means for the disc of a globe valve;

Fig. 2 is a vertical section of the same taken on the line 2—2 of Fig. 1;

Fig. 3 is a horizontal section taken on the line 3—3 of Fig. 2;

Fig. 4 is a plan view of the retainer used; and

Fig. 5 is a side elevation of the same.

Referring to the drawing, the valve stem 7 may be mounted in any suitable way in a valve body (not shown). The invention is particularly adapted to a threaded stem, as illustrated, which is rotated to screw the same toward or away from the valve seat, as in the conventional globe valve. The stem 7 terminates in a laterally flanged head 8 having a spherically curved end surface 9.

The valve disc 10 may have its lower face recessed, as illustrated, to receive a suitable packing to be pressed against the valve seat (not shown). The opposite face of the valve disc is formed with an axial bore 11 of a diameter to freely receive the head 8 of the valve stem 7 and terminating in a flat bottom wall adapted to engage the end 9 of the stem. The diameter of the bore 11 and the curvature of the end 9 are such as to permit limited universal angular movement of the disc 10 with respect to the stem 7 while the end 9 of the stem remains in contact with the bottom of the bore 11.

The bore 11 is surrounded by a cylindrical wall 12 which is formed with a circumferential groove 13. Parallel slots 13a are milled through the bottom of the groove 13, opening into the bore 11 on opposite sides of the disc.

The locking means used to connect the disc 10 to the stem 7 is a generally U-shaped member 14 made of resilient sheet metal or the like. The bight of the U-shaped member 14 is proportioned to fit against the bottom of the groove 13 with the two legs disposed in the slots 13a. The two legs of the member 14 are spaced to closely embrace the stem 7 above the head 8, and are of such length that their free ends 15 extend out of the groove 13 on one side when the bight of the member 14 is seated in the bottom of the groove on the other side.

The two legs of the member 14 are formed intermediate their ends with portions 16 bowed out of the plane of the member 14 in one direction, while the free ends 15 of the legs are bent out of the plane of the member 14 in the other direction. In assembled relation, the bight of the member 14 and portions of the legs engage the upper wall of the groove 13, the bowed portions 16 press resiliently against the upper surface of the head 8, and the ends 15 extend upwardly past the upper edge of the groove 13.

The retainer is inserted by sliding the ends through the slots 13a, over the head 8 and beyond the curve of the wall 12 on the farther side. The upturned ends 15 then latch against the wall 12 and hold the retainer against dislodgment. In this position the intermediate spring portions 16 press downwardly on the flanged head 8.

When so assembled the disc 10 is securely locked to the stem 7. However, when the valve is closed against its seat the disc 10 is rocked into the plane of the seat and around the convexity 9. This is made possible by the fact that the disc may be either rocked upon the intermediate curved portions 16, or at right angles thereto in which case one of the curved portions 16 is flexed toward a flattened position. Any adjustment angularly between these extremes is accomplished by a combination of the two movements described.

The resilient engagement of the bowed portions 16 with the upper edge of the head 8 also frictionally resists relative rotation of the stem 7 and disc 10. When the stem is turned to screw the disc toward its seat, the disc initially turns with the stem. When the disc first engages the seat it continues to turn with the stem, wiping the seating surfaces and insuring a tight closure of the valve. When the friction of the disc on the seat exceeds the friction of the retainer 14 against the head 8, the stem rotates with respect to the disc during the remainder of the closing movement, thereby avoiding excessive wear of the seating surfaces.

The improved attaching means is extremely simple in its design. It may be adapted readily to existing forms of valves. It is economical to manufacture. It may be manipulated and installed easily and without special knowledge or skill. The removal or replacement of a valve disc is of course facilitated by this attaching means.

While I have illustrated and described the preferred form of the invention, it is susceptible of embodiment in various forms, proportions and materials. Consequently the invention is to be construed as limited only by the scope of the appended claims.

I claim:

1. In combination, a valve stem having an enlarged head, a valve disc having a sleeve to receive said head, said sleeve being formed with a circumferential groove and an opening from the groove through the sleeve and a retainer slidable into the groove and into engagement with said head to hold said stem and disc in assembled relation.

2. In combination, a valve stem having an enlarged head, a valve disc having a sleeve to receive said head, said sleeve being formed with a circumferential groove and an opening from the groove through the sleeve and a resilient retainer slidable into said groove and arranged to resiliently press against said head and a wall of said groove to hold said stem and said disc against axial separation and to frictionally resist relative rotation thereof.

3. In combination, a valve disc formed with an axial recess, a valve stem having one end extending into said recess and into engagement with said disc, said disc being formed with slots opening into said recess on opposite sides of said stem, a retainer member having leg portions embracing said disc and having one leg portion lying in each slot and extending into said recess, portions of said stem engageable with said leg portions of the retainer to prevent axial separation of said stem and disc.

4. In combination, a valve disc formed with an axial recess, a valve stem having one end rotatably fitting into said recess and into engagement with said disc, said disc being formed with slots opening into said recess on opposite sides of said stem, a retainer member embracing said disc and having portions extending through said slots into said recess, and portions of said stem engageable with said portions of the retainer to prevent axial separation of said stem and disc, said retainer being formed to resiliently press against said disc and said stem to frictionally resist relative rotation thereof.

5. In combination, a valve closure member formed with a socket, a stem extending into and engaging the bottom of said socket and having limited universal angular movement with respect to said member, said socket being formed with an opening through the wall thereof and retainer means extending into said opening and yieldably engaging said closure member and said stem to prevent axial separation thereof while permitting universal angular movement of said socket with respect to said stem.

6. In combination, a valve stem having an end with a peripheral flange, a valve having a sleeve to receive said flange loosely, said sleeve being formed with a circumferential groove, said sleeve having formed therein a pair of substantially diametrically opposed openings from the groove through the sleeve, and a bifurcated retainer slidable into the groove and openings to hold the stem against removal.

7. In combination, a valve stem having a convex end with a peripheral flange, a valve having a sleeve to receive said stem end pivotally, said sleeve being formed with a circumferential groove, said sleeve having formed therein a pair of substantially diametrically opposed openings from the groove through the sleeve, and a retainer slidable into the groove and openings to hold the stem against removal.

8. In combination, a valve stem having an end with a peripheral flange, a valve having a sleeve to receive said flange loosely, said sleeve being formed with a circumferential groove and an opening from the groove through the sleeve, and a retainer slidable into the groove and engaging one wall thereof, said retainer having an offset intermediate portion bearing resiliently against the side of the said stem flange.

9. In combination, a valve closure member formed with a socket, a valve stem having a peripheral flange extending loosely into said socket, said socket being formed with a circumferential groove and with openings from the groove through the wall of the socket and a U-shaped retainer slidable into the groove and having portions extending through said openings into engagement with the flange on said stem.

10. In combination, a valve closure member formed with a socket, a valve stem having a peripheral flange extending loosely into said socket, said socket being formed with a circumferential groove and with openings from the groove through the wall of the socket and a U-shaped resilient retainer slidable into the groove and having portions extending through said openings into yieldable engagement with the flange on said stem, said retainer preventing axial separation of said stem and said member while permitting universal angular movement therebetween, and frictionally resisting relative rotation of said stem and retainer.

ALBERT J. WEATHERHEAD, JR.